United States Patent [19]

Tsubota

[11] 4,258,269
[45] Mar. 24, 1981

[54] WAVE POWER GENERATOR

[76] Inventor: Junjiro Tsubota, 2392, Jindaiji-machi, Chofu-shi, Tokyo 182, Japan

[21] Appl. No.: 35,694

[22] Filed: May 3, 1979

[51] Int. Cl.³ .......................................... F03B 13/12
[52] U.S. Cl. ...................................... 290/53; 290/42
[58] Field of Search ............................. 290/53, 42, 43

[56] References Cited

U.S. PATENT DOCUMENTS

| 2,715,366 | 8/1955 | Vartiainen | 290/42 |
| 3,200,255 | 1/1961 | Masuda | 290/53 |
| 3,515,889 | 8/1967 | Kammerer | 290/53 |

FOREIGN PATENT DOCUMENTS

| 2812618 | 9/1978 | Fed. Rep. of Germany | 290/53 |
| 2272274 | 12/1975 | France | 290/53 |

Primary Examiner—Gene Z. Rubinson
Assistant Examiner—Donald L. Rebsch
Attorney, Agent, or Firm—Shoemaker and Mattare, Ltd.

[57] ABSTRACT

A power generator which uses the motion of water waves to drive liquid through an impulse turbine. A housing is located in a body of water such as an ocean, or a lake, or the like, which is subject to waves. One form of the generator includes chambers fixed within the housing and another form includes floating chambers. One form of the generator uses an open cycle wherein water from the body of water is used to drive the turbine, and another form has liquid interchange between a pair of reservoirs located within the housing.

12 Claims, 4 Drawing Figures

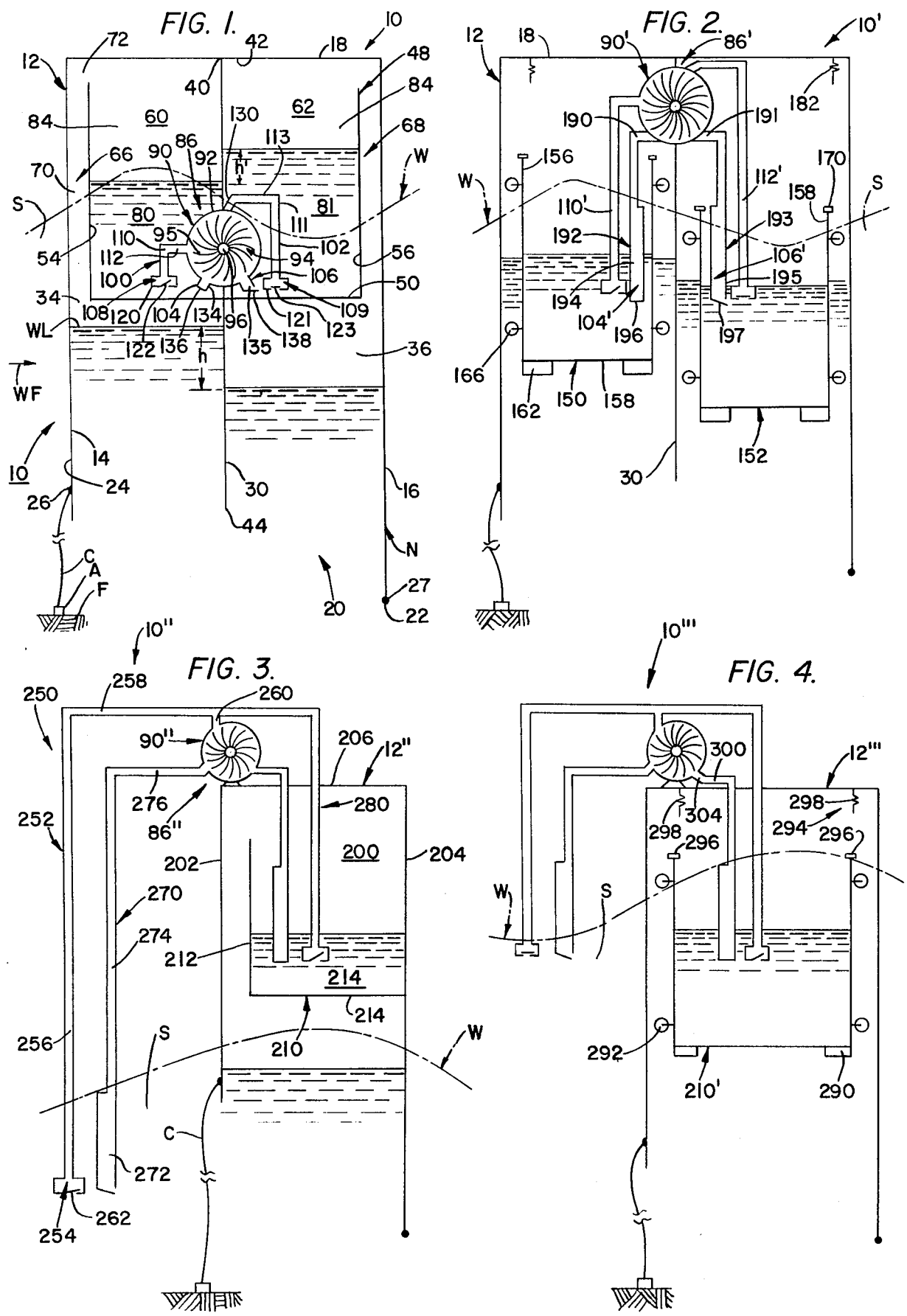

WAVE POWER GENERATOR

BACKGROUND OF THE INVENTION

The present invention relates in general to energy conversion systems, and, more particularly, to systems which convert water wave energy into other forms of energy.

The energy of water waves, such as those found in oceans, lakes, or the like, is well known and documented. There are many devices which are intended to convert this wave energy into usable power, such as electrical and/or mechanical power. One example of these devices is disclosed in U.S. Pat. No. 3,200,255, wherein a buoy or offshore station uses the rise and fall of water as a wave passes by the buoy or offshore station to force air through a turbine to thereby drive that turbine.

The turbines of such known devices are driven by the impact of air with rotor blades, and thus a major drawback of these devices is the inefficiency thereof.

Accordingly, there is need for a wave energy converter which converts the wave energy into other forms of energy in a manner which does not suffer the drawbacks of known devices, and is accordingly more efficient than such known devices.

SUMMARY OF THE INVENTION

The wave energy converter embodying the teachings of the present invention utilizes liquid as the impulsing means for an impulse turbine, and accordingly is capable of generating much more energy than known devices, especially those known devices which utilize air as the impulsing means.

The converter of the present invention includes a housing which has at least one compartment defined therein. The housing is positioned in a body of water which is subject to waves, and has an open bottom so that water moves into and out of the housing. The level of water within the housing varies as waves pass by that housing. A container is located within the housing so that an air space is defined between the container and the housing. The container has a reservoir of liquid located therein.

An impulse turbine is mounted on the housing and two fluid intake and exhaust systems are fluidly connected to that turbine. One of the intake and exhaust systems fluidly connects the reservoir with the turbine. One embodiment of the invention includes a pair of containers with the second intake and exhaust systems fluidly connecting a reservoir in the second container with the turbine so the system operates in a closed cycle, that is, liquid from the two reservoirs is used to operate the turbine. Another embodiment of the invention includes the second intake and exhaust systems located externally of the housing so the system operates on an open cycle, that is, water from the body of water moves through the turbine to and from the reservoir to operate that turbine.

One embodiment of the invention includes a fixed container, and another embodiment includes a floating chamber.

As a wave passes by the housing, the water level within the housing changes. The change in water level within the housing changes the pressure of air within that housing and increases or decreases the pressure applied to a particular reservoir accordingly. One-way valves and the like are included on the intake systems so that the variation in pressure within the housing causes liquid from an appropriate reservoir to be forced through the tubine via the intake and exhaust systems.

A combination of pressure differential across the turbine and siphon action due to the height differential of the liquid levels adjacent the two intake systems drives the liquid through those systems and through the turbine.

The closed cycle system has liquid moving between reservoirs, and accordingly, pressure variation adjacent each reservoir contributes a substantial driving force to the total driving force. The open system has one of the intake exhaust systems immersed in the open water; however, there is still a pressure differential and water level differential existing between the reservoir and the open water so that water is still forced through the turbine Liquid is forced against the blades of the turbine from the intake systems to drive that turbine. As the mass of liquid far exceeds the mass of air, an impulse turbine driven by liquid will generate more power than the impulse turbine driven by air, other things being equal. Accordingly, the system of the present invention generates more energy and power than those systems utilizing air to drive a turbine.

OBJECTS OF THE INVENTION

It is a main object of the present invention to provide an efficient wave energy converter.

It is another object of the present invention to provide a wave energy converter which utilizes liquid to drive an impulse turbine.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is an elevation view of one form of a wave energy converter embodying the teachings of the present invention.

FIG. 2 is an elevation view of another form of a wave energy converter embodying the teachings of the present invention.

FIG. 3 is an elevation view of another form of a wave energy converter embodying the teachings of the present invention.

FIG. 4 is an elevation view of another form of a wave energy converter embodying the teachings of the present invention.

DETAILED DESCRIPTION OF THE INVENTION

Shown in FIGS. 1-4 are wave energy converters which utilize waves moving in bodies of water, such as oceans, lakes, or the like, to generate power. A wave is indicated generally in FIGS. 2-4 at W, and the sea or lake water is indicated at S in the Figures.

A first form of an energy generating system using wave motion and embodying the teachings of the present invention is shown in FIG. 1, and is indicated by the reference indicator 10. The energy generating system 10 includes a housing 12 anchored to the bottom F of the body of water, such as the sea floor, or the like, by a mooring means which includes an anchor A and a tether chain C. The housing 12, like all other housings disclosed herein, is partially immersed in the water and is weighted and balanced to remain upright in the water. The housing preferably has rectangular walls such as walls 14 and 16, and a rectangular top 18. The walls and top enclose the housing on five of the six sides thereof, while leaving the bottom 20 of the housing open to permit the influx of water into the housing for a purpose to be described below. As shown in FIG. 1, the wall 14 terminates above the lowermost terminal edge 22 of the wall 16 and the tether chain C is attached to outer surface 24 of the wall 14 by an attaching means 26 or the like. The tether chain C permits some play or floating motion of the housing to prevent damage or swamping thereof. The longer wall 16 may include a rigid upper portion and a lower portion having a net N contained therein, if suitable. A weight or other anchor means 27 can be attached to the lowermost edge 22 of the wall 16, or that edge can be anchored directly to the bottom F if suitable. The other four side walls of the housing 12 can have lengths equal to either wall 14 or wall 16, but it is preferable that the walls be equal in length to wall 14 to permit easy access to the interior of the housing by water.

The housings of this invention are preferably essentially airtight, and a fixed partition 30 divides the housing 12 into two compartments 34 and 36 which are separated from each other so that essentially no air is transferred therebetween. The partition 30 is preferably an elongate wall having a top end edge 40 thereof fixedly attached to inner surface 42 of the housing top wall 18 and having the lower end edge 44 thereof free. In a preferred embodiment, the wall 14 and the partition 30 are essentially co-extensive so that the lower terminal edges of the wall 14 and partition 30 are essentially co-planar with each other.

An open container 48 is fixedly mounted on the partition 30 and includes a bottom 50 fixed to the partition to be essentially parallel with and spaced from the housing top 18 and to extend on both sides of the partition into both compartments of the housing. The container includes four co-extensive side walls, such as walls 54 and 56, and thus, along with the partition and the housing top, defines a pair of open, juxtaposed chambers 60 and 62.

The container has an outer perimeter which is smaller than the inner perimeter of the housing so that passageways, such as passageways 66 and 68, are defined between the container and the housing. The passageways include a vertical section 70 and a corner section 72 and air moves within the passageways as will be described below. Each of the chambers 60 and 62 contains a body of liquid, or reservoirs 80 and 81, respectively, and is located so that water S from the sea or lake is not likely to flow into those reservoirs. The container 48 thus is a closed system with respect to the liquid contained therein. The liquid within the reservoirs is preferably water, such as water S, or the like, but can be other fluids if so desired. The reservoirs contain sufficient liquid so that an air space 84 is defined in each chamber for a purpose to be presently described A water activated energy system 86 includes an energy converter, such as an impulse turbine 90, which is fixedly mounted on the partition 30 to straddle same and to be located within the container 48. The turbine is located within the container to remain essentially completely immersed throughout the operation of the system 10, and includes a turbine casing 92 and a turbine rotor 94 rotatably mounted within the casing 92 and having a multiplicity of rotor blades 95 mounted on a rotor shaft 96. The motor shaft is connected to an energy generator, such as an electrical generator or the like, to translate the rotary motion of the rotor shaft into usuable energy such as electrical or mechanical energy. The energy generator is now shown as the structure thereof and connection thereof to the rotor shaft 96 will occur to those skilled in the art from the disclosure presented herein.

The energy system 86 further includes fluid intake pipes 100 and 102 located within the chambers 60 and 62, respectively, and a pair of fluid exhaust pipes 104 and 106 located within chambers 60 and 62, respectively. The intake pipes include entrance sections 108 and 109 fluidly coupled to riser sections 110 and 111 which, in turn, are fluidly connected to cross pipes 112 and 113 so that the riser sections are fluidly interposed between the entrance sections and the cross pipes of the intake pipes. The entrance sections include valve housings 120 and 121 with one-way valves 122 and 123 mounted therein to control and regulate flow of fluid into the intake conduit. The cross pipe 112 of the fluid intake system 110 is connected to the turbine housing 92 at or near the height of the rotor shaft 96 with respect to the bottom of the container 48 so that cross pipe 112 is essentially horizontally disposed. The intake sections 108 and 109 are essentially co-level and are both spaced above the container body 50, and the riser section 111 is longer than the riser section 110 so that cross pipe 113 is located above the cross pipe 112, but is still oriented to be essentially horizontal. The top end of the riser 111 is located above the turbine 90, and is fluidly connected thereto by a downcomer 130 which is slanted toward the partition 30 from the cross pipe 113, and is fluidly and fixedly attached to the turbine at or near the partition 30 and hence near the top of the turbine casing.

While not shown in FIG. 1, flow directing means, such as orifices, nozzles, or the like, can be located in the cross pipe 112 at or near the junction thereof with the turbine and in the downcomer 130 at or near the junction thereof with the turbine to direct flow to liquid against the rotor blades in a manner used in impulse turbines.

The exhaust systems 104 and 106 include exhaust conduits 134 and 135 fixedly mounted on the turbine housing to depend downwardly therefrom and away from each other. Covers 136 and 138 cover the lowermost ends of the exhaust conduits and may include one-way valves if so desired to control and regulate flow exhausted from the turbine 90.

Operation of the generating system 10 is as follows. Assume a wave front passes from left to right of FIG. 1 as indicated by arrow WF. As each wave passes the housing 12, the compartment 34 will be located in a wave crest area while the compartment 36 will be located in a wave valley or trough area so that there will be a height differential between the water level in the compartments as indicated at h in FIG. 1 and which corresponds to wave height.

As the water level WL of the water S rises in the compartment 34, the air trapped in that compartment is compressed above the water level. Air moves into chamber 60 via the air passageway 66 and thus increases the pressure exerted on the fluid in the reservoir 80.

While the water level in compartment 34 is rising, the water level in compartment 36 is falling both actually and relatively. The falling water level in chamber 36 causes a corresponding decrease in pressure exerted on the liquid in reservoir 81 as air moves out of the compartment 62 via passageway 68. There will be a corresponding height differential h' established between the liquid levels in the two compartments 60 and 62 as indicated in FIG. 1.

There is fluid communication between the fluid filled compartments 60 and 62 via the turbine 90. Thus, the increase in pressure in compartment 60 causes fluid to flow into the intake system 100 on its way to compartment 62 as induced by the pressure and height differentials between the two compartments.

As fluid flows from the cross pipe 112 into the turbine, that fluid impacts the rotor blades, thereby driving the turbine rotor in a clockwise direction in FIG. 1. Fluid will flow out of the exhaust system 106 into the reservoir 81 in the compartment 62 thereby increasing the level in that reservoir. Fluid flow rate is a function of liquid levels, pressure differentials, and friction factors, as well as factors incident to flow through the turbine 90. Liquid will not flow out of either exhaust system 104, due to the pressure established in the compartment 60, or intake system 102, due to the one-way valve 123.

As the wave moves on by the housing 12, the situation just described will be reversed, that is, the wave crest will be located adjacent compartment 36 and a following wave valley will be located adjacent the compartment 34. The pressure and height differentials just described will be reversed so that liquid will be forced through the turbine 90 from reservoir 81 into reservoir 80. A siphon action also assists the flow of fluid due to the difference in height between risers 110 and 111. The downcomer 130 inducts liquid into the turbine in a direction such that the clockwise direction of the turbine rotor is continued. Fluid is exhausted into the reservoir 80 via the exhaust system 104 in a manner similar to that described above with regard to the exhaust system 106.

As seen in FIG. 1, liquid is constantly flowing through the turbine 90 as a wave front passes by the system 10. The turbine generator system is thus generating power in an essentially constant and uninterrupted manner. Furthermore, and importantly, the fluid used to drive the turbine is liquid, preferably water, which has a density vastly greater than the density of a gas such as air. The efficiency of a liquid driven turbine far exceeds the efficiency of a gas driven turbine, other things being equal, simply due to the increased density of liquid over gas. This is especially true for the impulse type turbine described herein wherein potential energy of the driving fluid is converted into kinetic energy and absorbed by the rotor. Impact of a high density mass exceeds that of a low density mass, other things being equal.

Another form of the energy generating system is shown in FIG. 2 and is denoted by the reference indicator 10'. In the system 10', floating chambers 150 and 152 replace the compartments 60 and 62 of the system 10, and the turbine 90' is located near the top 18 of the housing 12 so that turbine is not immersed in liquid during the operation of the system 10'.

The floating chambers are open topped and include four rectangular side walls 156 and a bottom wall 158. Floats 162 are mounted on the bottom wall 158 to provide each chamber with sufficient buoyancy even when substantially full of water. Guides 166, such as trundles, or the like, are mounted on the side walls, preferably all of the side walls, to be interposed between those side walls and the housing side walls, and to thereby guide movement of the containers within the housing compartments. An impact absorber system is associated with each of the floating containers and includes an impact cushion 170 mounted on the top rim of the containers and an impact spring 182 mounted on the housing top 18 to be impacted by the cushion 170 and thereby absorb impact and prevent damage to the containers in the event a wave having an unusually large height passes by the system. Movement of the containers is controlled by wave height, and thus, the impact absorber system is required.

The water activated energy generator system 86' is similar to that system described above except that the riser sections 110' and 112' in the system 86' are longer than their counterparts in the system 86 to accommodate the elevated position of the turbine 90' with respect to the position of the turbine 90 in the system 86. Furthermore, the exhaust sections 104' and 106' of the system 86' are slightly modified from the exhaust sections 104 and 106. The exhaust sections of system 86' include cross conduits 190 and 191 fluidly attached to the lower portion of the casing 92' and extend horizontally away from each other in a coaxial manner, and downcomer conduits 192 and 193 which are vertically oriented and fluidly connected at the top ends thereof to the outer ends of the cross conduits. The lower portions 194 and 195 of the downcomer conduits are enlarged as indicated in FIG. 2, and closure means, such as flapper valves 196 and 197, or the like, are mounted on the lowermost end of the downcomer conduits.

Operation of the system 10' is similar to that of the system 10 except that the chambers 150 and 152 move under the influence of the passing wave. However, air in the air spaces defined adjacent the chambers 150 and 152 is still compressed and the liquid from the reservoirs in the containers is still forced through the turbine. In the system 10', siphon action has a much stronger influence on liquid movement in comparison to pressure influences than such action has on the liquid movement in the system 10 as compared to the pressure influences in system 10. Strong siphon action influence results from the positioning of the turbine 90' above that position corresponding to a location of turbine 90 in the system 10. The system 10', like the system 10, is a closed system in that the liquid is transferred from one reservoir into another reservoir during operation of the system.

Further forms of the energy generating system are shown in FIGS. 3 and 4. The systems are denoted as 10″ and 10‴, and are open systems. That is, only one reservoir of liquid is used, and the other end of the system is open to the body of water in which the housing is located. Thus, liquid in the one remaining reservoir flows into that reservoir from the body of water, and from that reservoir back into the body of water during one cycle of operation of the system. As with the systems 10 and 10', one cycle of operation is defined from the time a wave first encounters the upstream (as measured with respect to the wave movement) side of the housing until the time that wave passes the downstream side (as measured with respect to wave movement) of the housing so that a compartment will have experienced both a filling and an emptying action as first the wave crest passes then a wave valley passes that compartment.

System 10" includes a housing 12" having a single compartment 200 defined therein by front wall 202, side walls, rear wall 204 and top wall 206. The front wall is connected to an anchor by a tether chain C, or the like, and the rear wall can have a net included therein if desired. A container 210 is fixedly mounted within the housing and includes a front wall 212, side walls and a bottom wall 214 fixed to the housing. The top of the container 210 is open, and spaced from the top of the housing. An air space is thus defined between the front walls of the container and the housing, and if desired, between the side walls as well. The top of the container is spaced from the top of the housing. A liquid reservoir 214, preferably of water, is contained within the housing 210.

The water activated energy system 86" includes a turbine 90" located outside the housing 12' and supported either on top of the housing or just above that housing. An exterior activating system 250 includes an intake system 252 having an intake valve housing 254 on the lower end of a vertical riser conduit 256 positioned to be immersed in the water even in a wave valley and a horizontal cross conduit 258 fluidly connected to the upper end of the riser conduit. As shown in FIG. 3, the cross conduit is located slightly above the top of the turbine, and thus a downcomer 260 is used to fluidly connect the cross conduit to the turbine 90". A valve, such as one-way valve 262, is located in the valve housing to control and regulate inflow of water into the intake conduit, and hence into the turbine.

The exterior system 250 further includes an exhaust system 270 which has an exit section 272 on the lower end of a vertical downcomer conduit 274. The exit section is approximately co-level with the lower end of the intake system intake valve housing. A cross conduit 276 fluidly connects the top of the downcomer conduit 274 to the turbine 90".

The energy system 86" further includes an interior activating system 280 which is similar to the exterior system 250 except that the corresponding conduits thereof are slightly shorter than those conduits of the exterior system so that the interior system can be accommodated within the container 210 as shown in FIG. 3. The riser and downcomer conduits of the interior system 280 extend through the housing top 206. The cross pipe of the interior intake system is fluidly connected to the downcomer conduit 260 to be fluidly connected with the turbine.

As a wave passes the housing 12", the water level within the housing rises and falls according to whether a crest or a valley is passing the housing. FIG. 3 indicates water for a wave crest. The pressure within the housing 12" varies according to the level of water in the housing due to the open bottom thereof, and the level of liquid of the reservoir 214 is controlled accordingly. Water enters through the exterior system when a crest is located adjacent exterior system 250.

Through a combination of siphon and pressure action, liquid from the reservoir 212 flows through the turbine 90" and out into the body of water, or from the body of water through the turbine into the reservoir 214. Thus, in a manner similar to the system 10', liquid is essentially constantly forced through the turbine 90" to activate that turbine in an essentially continuous manner.

The system 10''' shown in FIG. 4 is similar to systems 10' and 10" shown in FIGS. 2 and 3 in that system 10''' is open and utilizes a floating container 210' having floats 290 on the bottom, guides 292 on the side walls and an impact absorber system 294 thereon which includes a cushion 296 on the container upper rim and an impact absorbing spring 298 on the housing top. The cross conduit 300 of the interior activating system exhaust system of the system 10'''' is fluidly connected to the turbine 90''' by a slanted downcomer 304. Furthermore, the lengths of the internal and external turbine activating system conduits are essentially equal as shown in FIG. 4.

As a wave passes housing 12''', the floating container 210' rises and falls accordingly. FIG. 4 shows a position of the container when a wave crest is nearly aligned with the centerline of the housing. The container is on the rise. A combination of siphon action, due to the difference in height between the water in the reservoir 214' in the floating container and the water located at the exit of the exterior exhaust conduit which is at or near a wave valley in FIG. 4, and the pressure increase induced on the water in the reservoir 214' due to the upward movement of the container 210', causes water to flow from the container through the turbine and out into the body of water. The turbine rotor is thus driven in a clockwise direction by the impact of water from the reservoir with the rotor blades. The reverse will occur when the wave crest is upstream of the housing, but rotor rotation will still be clockwise as is also the case in the system 10".

The housings and other elements of the converters disclosed herein are selected so that one of the intake-exhaust systems is closely adjacent a wave, or preferably a wave crest, while the other intake-exhaust system is closely adjacent a wave valley or trough, and preferably located in such valley or trough. Such spacing will provide an optimum pressure and liquid level height differential for the systems.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A wave energy converter comprising:
a housing located in a body of water in a position to be subjected to wave motion occurring in that body of water, said housing having one end thereof submerged and open to receiver water from the body of water and another end thereof positioned to be above water so that water level within said housing varies as waves pass by said housing;
a container having a reservoir of liquid contained therein, said container being connected to said housing through a spaced portion which defines an air space between said reservoir and the water received in said housing from said body of water;
a water activated energy generating system including a turbine or water wheel attached to said housing, a first intake system having an intake end thereof submerged in said reservoir and another end thereof fluidly connected to said turbine to conduct liquid against a rotor in said turbine for operating said turbine, a first exhaust system fluidly connected to said turbine for removing liquid therefrom, said generating system further including a second intake system having an intake end thereof submerged in said body of water or another reservoir of liquid and another end thereof connected to said turbine to conduct liquid against a rotor in said turbine for operating said turbine, and a second exhaust system fluidly connected to said turbine for removing liquid therefrom;

said first and second intake systems alternately conducting liquid against a turbine rotor in said turbine as waves move past said housing so that said turbine is operated in an essentially continuous manner by impact of liquid against a rotor in said turbine; and means for withdrawing energy from said turbine.

2. The wave energy converter defined in claim 1 wherein said housing is divided into a plurality of chambers, said container with reservoir being fixedly connected to each of not less than two of said chambers through a spaced portion which defines an air space between said reservoir and water received in said each chamber from said body of water, and an intake and exhaust system, each fluidly connecting a turbine or water wheel to said reservoir in said each chamber.

3. The wave energy converter defined in claim 2 wherein said container floats within said each chamber of said housing.

4. The wave energy converter defined in claim 1 wherein said container is fixedly located in said housing, said turbine being located externally of said housing and said second intake and exhaust systems being located externally of said housing and immersed in said body of water outside of said housing.

5. The wave energy converter defined in claim 1 wherein said container freely floats within said housing.

6. The wave energy converter defined in claims 1, 2, 3 or 5 wherein said turbine is mounted on said housing exteriorly thereof.

7. The wave energy converter defined in claims 1, 2, 3, 4, 5 or 6 further including mooring means anchoring said housing in place.

8. The wave energy converter defined in claims 3 or 5 wherein said container includes guide means interposed between said container and said housing.

9. The wave energy converter defined in claims 3, 5 or 8 wherein said container further includes impact absorbing means thereon and said housing further includes impact absorbing means thereon.

10. The wave energy converter defined in claims 1, 2, 3, 4, 5, 6, 7, 8 or 9 wherein said turbine includes a casing which is airtight and which prevents air from entering said turbine so that said turbine is driven essentially completely by liquid from said reservoir.

11. The wave energy converter defined in claims 1, 2 or 3 wherein the converter operates on a closed cycle.

12. The wave energy converter defined in claims 1, 4 or 5 wherein the converter operates on an open cycle.

* * * * *